United States Patent [19]

Russo

[11] 4,101,471

[45] Jul. 18, 1978

[54] HIGH RESILIENCY FOAM WITH IMPROVED LOAD BEARING ABILITY BY USE OF ORGANOTIN MERCAPTIDES

[75] Inventor: Robert V. Russo, Brooklyn, N.Y.

[73] Assignee: M & T Chemicals Inc., Stamford, Conn.

[21] Appl. No.: 641,964

[22] Filed: Dec. 18, 1975

[51] Int. Cl.$^2$ .................... C08G 18/22; C08G 18/63; C08G 18/66
[52] U.S. Cl. .................................. 521/121; 521/137; 521/904; 521/163
[58] Field of Search .................... 260/2.5 AB, 2.5 AC, 260/77.5 AB, 77.5 AC, 2.5 BE, 2.5 AM

[56] References Cited

U.S. PATENT DOCUMENTS

| | | | |
|---|---|---|---|
| 3,342,757 | 9/1967 | Considine | 260/2.5 AB |
| 3,392,153 | 7/1968 | Hostettler | 260/2.5 AB |
| 3,772,222 | 11/1973 | Steward | 260/2.5 AB |
| 3,887,505 | 6/1975 | Demou | 260/2.5 AB |
| 3,933,692 | 1/1976 | Kushlefsky | 260/2.5 AM |
| 3,975,317 | 8/1976 | Russo | 260/2.5 AC |

*Primary Examiner*—C. Warren Ivy
*Attorney, Agent, or Firm*—Kenneth G. Wheeless; Robert Spector

[57] ABSTRACT

The load-bearing characteristics of high resiliency polyurethane foams, as expressed by the loading required to obtain a 65% reduction in thickness, are significantly improved using as the gel catalyst certain diorganotin mercaptides or mercaptoesters.

8 Claims, No Drawings

HIGH RESILIENCY FOAM WITH IMPROVED LOAD BEARING ABILITY BY USE OF ORGANOTIN MERCAPTIDES

BACKGROUND OF THE INVENTION

High resiliency polyurethane foams are desirable for numerous applications, particularly as cushioning material for the seats and backs of upholstered furniture. The high resiliency and good load-bearing properties of these foams make it possible to eliminate the springs in upholstered furniture and car seats which were formerly required to achieve the desired load bearing properties using conventional foams. The properties of high resiliency foams resemble those of latex rubber and provide a high level of comfort.

The load bearing ability of a polyurethane foam is often determined using the Indentation Load Deflection (ILD) test (ASTM Test Method D-2406 Method A). The "comfort index" is defined as the ratio of the ILD value measured at 65% deflection to the value measured at 25% deflection. A ratio of 2.2 or greater is desirably for optimum seating comfort. Conventional cellular polyurethanes usually exhibit ratios of between 1.8 and 2.2. The procedure employed to measure indentation load deflection is described in a subsequent portion of this specification.

To achieve maximum seating comfort the weight or loading required for deflections up to 25% should be relatively low, thereby providing an initial sensation of softness. As the deflection passes the 25% level the loading required to obtain additional deflection should increase relatively rapidly in a non-linear manner to achieve the desired ultimate load bearing properties. The loading required to achieve 65% deflection should preferably be greater than one pound per square inch. In practical terms, if the foam is to be incorporated into a seat cushion, the ILD value at 65% deflection should be as high as possible, since this determines the minimum thickness of foam required to support a given weight. Even a small reduction in thickness can result in a considerable savings in material costs for a large scale operation.

High resiliency foams are conventionally prepared by reacting high molecular weight polyols (MW=4,500–6,000) which may contain grafted side chains of polyacrylonitrile or an acrylonitrile-styrene copolymer, with a polyfunctional isocyanate. At least a portion of the isocyanate component is usually polymeric, such as polymethylene polyphenyl isocyanate. Alternatively, a completely difunctional isocyanate, such as a mixture of 2,4- and 2,6-tolylene diisocyanates can be used in combination with a polyfunctional amine as a chain extending or crosslinking agent to maintain the crosslink density at the level achieved using a polymeric isocyanate. The reaction between polyol and isocyanate is usually catalyzed by a polymerization or "gel" catalyst. Organotin compounds, particularly derivatives of monocarboxylic acids such as dibutyltin dilaurate, are desirable gel catalysts because of the relatively short rise and "tack free" times that can be achieved. In addition, uncured foams are sufficiently coherent that they will not break apart when handled. This property is known as "green strength". The uncured foam can therefore be removed from the container in which it was formed. The decreased residence time is particularly desirable for a commercial operation, since it increases the output of the equipment employed to prepare the foam, measured on a pounds-per-hour basis.

As will be demonstrated in the accompanying examples, the highest ILD value that can be achieved at 65% deflection using conventional organotin gel catalysts is less than one pound per square inch. It is therefore an objective of this invention to define a class of gel catalysts which impart a higher load-bearing ability to polyurethane foams than can be achieved using these conventional organotin catalysts without sacrificing any of the desirable properties, such as rapid rise time and high green strength.

It has now been found that this objective can be achieved using certain organotin mercaptides or organotin derivatives of mercaptocarboxylic acid esters as the gel catalyst.

SUMMARY OF THE INVENTION

This invention provides formulations for preparing high resiliency cellular polyurethanes. The formulations comprise a polymeric, polyfunctional isocyanate, at least one polyol selected from the group consisting of 1. polyols exhibiting a molecular weight of between 4,500 and 6,000 and a hydroxyl number from 25 to 45,
2. polyols exhibiting a molecular weight between 4,500 and 6,000 and a hydroxyl number from 25 to 45, wherein said polyol contains between 5 and 25%, based on the weight of said polyol, of side chains derived from the graft polymerization of acrylonitrile or a mixture of acrylonitrile and styrene onto the backbone of said polyols,
3. mixtures of polyols exhibiting a molecular weight between 4,000 and 8,000 and at least one diamine as a cross-linking agent, said diamine being present in an amount between about 0.5 and 6%, based on the weight of said polyol, a blowing agent, a silicone-base surfactant and as the polymerization catalyst, between 0.001 and 0.1%, based on the weight of said polyol, of an organotin compound of the formula $R_2^1Sn(SR^2)_2$, wherein $R^1$ is selected from the group consisting of alkyl radicals containing between 1 and 20 carbon atoms, $R^2$ is selected from the same group as $R^1$ and radicals of the formula $-R^3COOR^4$, wherein $R^3$ represents a methylene or ethylene radical and $R^4$ is selected from the same group as $R^1$.

DETAILED DESCRIPTION OF THE INVENTION

The present gel catalysts provide all of the processing advantages and desirable properties that characterize organotin compounds. In addition, the catalysts improve the load-bearing properties (as determined using the indentation load deflection at 65% indentation). The present catalysts are conventionally employed at concentrations of between 0.005 and 0.1 part by weight for every 100 parts of polyol.

As disclosed in a preceding section of this specification, high resiliency polyurethane foams exhibit a higher degree of crosslinking than conventional foams. The average functionality of the isocyanate that is reacted to form the polyurethane will therefore be higher than 2, usually between 2.05 and 2.5. This degree of functionality is achieved using the appropriate mixture of a difunctional isocyanate, such as the isomeric tolylene diisocyanates, and an isocyanate exhibiting a functionality higher than 2, such as polymethylene polyphenyl isocyanate.

The polyol component is often of high molecular weight (usually between 4,500 and 6,000) and may contain grafted side chains of polyacrylonitrile or an acrylonitrile-styrene copolymer. If lower molecular weight polyols are present in the reaction mixture, they are usually employed in combination with an aromatic or cycloaliphatic difunctional amine as a chain-extending agent or crosslinking agent. Preferably between 10 and 90% of the terminal hydroxyl groups of the polyol are bonded to a primary carbon atom, i.e., —CH$_2$—, to achieve greater reactivity and facilitate curing of the foam. Since many conventional polyols are prepared by polymerizing propylene oxide in the presence of a polyhydric compound such as glycerine, which would yield secondary terminal hydroxyl groups, these reaction products are often end-capped with ethylene oxide to obtain the desired concentration of primary hydroxyl groups.

Classes of polyols exhibiting a molecular weight greater than 4,500 which are suitable for use in preparing high resiliency foams include hydroxyl-terminated polyesters, polyethers, polyisocyanate modified polyesters, polyamides, polyalkylene glycols, polymercaptans, polyamines and polyisocyanate-modified alkylene glycols. These polyalkylene polyols may exhibit active primary or secondary hydroxyl groups. Polyesters, a preferred type of polyalkylene polyol, include fatty acid glycerides, and are obtained by the esterification-condensation reaction of aliphatic dibasic carboxylic acid with a glycol or a triol, or mixtures thereof, in proportions such that the terminal groups of the resultant polyesters are predominately hydroxyl.

Dibasic carboxylic acids suitable for preparing hydroxy-terminated polyesters include aliphatic and aromatic acids such as adipic acid, fumaric acid, sebacic acid and the isomeric phthalic acids. Suitable alcohols include ethylene glycol, diethylene glycol and trimethylol propane. Fatty acid glycerides include those having a hydroxyl number of at least 25, such as castor oil, hydrogenated castor oil and blown natural oils.

Polyethers, a second preferred type of polyalkylene polyol, include polyalkylene glycols such as polyethylene and polypropylene glycols. The latter are preferably end-capped with ethylene oxide to obtain the desired concentration of primary hydroxyl groups.

Preferred polyethers include polypropylene glycols, reaction products of propylene oxide with linear diols and higher polyols, said higher polyols when employed as reactants giving rise to branched polyoxyalkylene polyols, ethylene oxide-propylene oxide copolymers having average molecular weights of 500 to 5,000 in which the weight ratio of ethylene oxide to propylene oxide ranges between 10:90 and 90:10 and reaction products of mixtures containing ethylene oxide and propylene oxide within the aforementioned ratios with linear diols and higher polyols. Examples of these linear diols include ethylene glycol, propylene glycol and 2-ethyhexanediol-1,3. Representative higher polyols include glycerol, trimethylol propane, 1,2,6-hexane triol, pentaerythritol and sorbitol.

Another class of polymers having terminal groups containing reactive hydrogen atoms suitable for reaction with polyisocyanates are lactone polymers, preferably those exhibiting molecular weights within the range of 5,000 to 10,000.

To achieve the desired degree of resiliency in the final foam the polyol is reacted with a polymeric polyfunctional isocyanate containing two or more repeating units, each of which, in turn, contains one or more isocyanate groups. Representative polymeric isocyanates have been discussed hereinbefore. To avoid foams which are excessively stiff and "boardy", it may be desirable to employ mixtures of one or more of these polymeric isocyanates and at least one monomeric difunctional isocyanate. The latter class of compounds is represented by alkyl di-isocyanates such as hexamethylene diisocyanate, decamethylene diisocyanate, the isomeric tolylene diisocyanates, naphthalene diisocyanates, 4,4'-diphenylmethane diioscyanates and mixtures containing two or more of these compounds. Triisocyanates (typically obtained by the reaction of 3 moles of an arylene diisocyanate with 1 mole of a triol, e.g. the reaction products formed from 3 moles of tolylene diisocyanate and 1 mole of hexane triol) may also be employed. A preferred difunctional isocyanate is the mixture containing 80% by weight of 2,4-tolylene diisocyanate and 20% 2,6-tolylene diisocyanate.

The term "isocyanates" is used herein to refer to both polyisocyanates and polyisothiocyanates. While the invention has been described specifically with reference to the reaction of certain isocyanate compounds, it is generically applicable to the reaction of any compound containing two or more —N═C═G groups in which G is oxygen or sulfur. Compounds within this generic definition include polyisocyanates and polyisothiocyanates of the general formula:

$$R(NCG)_x$$

in which $x$ is two or more and R can be alkylene, substituted alkylene, arylene or substituted arylene.

The preparation of high resiliency urethane foams can be carried out by forming a prepolymer, i.e., prereacting molar equivalents of the polyol and polyfunctional isocyanate in the absence of water or other blowing agent, and thereafter producing a foam by the addition of excess isocyanate, water, and the novel catalyst of this invention. The present catalysts are eminently suitable for the production of urethane foams by the so-called "one shot" method in which the polyol, gel catalyst and isocyanate reactants are simultaneously mixed together and allowed to react in the presence of water and any auxiliary blowing agents.

Alternatively, urethane foams can be prepared using a "semiprepolymer" wherein a polyether reactant has been reacted with excess isocyanate to form a reaction product containing a high percentage of free isocyanate groups (20%–35%). This product is subsequently converted into a foam by the addition of the polyol reagent and one of the novel gel catalysts of this invention.

Irrespective of the procedure employed to prepare the final foam, the ratio of the number of isocyanate groups to the total number of active hydrogen atoms present in the reaction mixture is between 0.95 and 1.1. The term "active hydrogen atoms" include those present in the polyol, water and any diamine employed as a chain extender.

In addition to the aforementioned polyol, polyfunctional isocyanate, gel catalyst and blowing agent (the blowing agent containing between 2.0 and 4.0% of water, based on the weight of the polyol, and between 0 and 10%, based on the weight of total blowing agent, of a volatile fluorinated hydrocarbon that boils at between −40° and 70° C.)formulations for preparing high resiliency polyurethane foams usually include a silicone-base surfactant such as Niax ® silicone L-5303, available from Union Carbide Chemical Corporation. A blowing catalyst, usually a bicyclic tertiary amine such as triethylene diamine can be used either alone or in combination with other amines such as N-ethyl morpholine, to achieve the desired balance between the rates of the polymerization reaction and the gas-forming or "blowing" reaction that occurs between the water and the isocyanate. This balance is required to obtain a foam exhibiting the desired uniform cell structure. If a blowing catalyst is employed, it is usually present at a concentration of between 0.005 and 1.0 part by weight per 100 parts of polyol.

Commercial processes for making polyurethane foams often employ the aforementioned "one shot" technique whereby the polyfunctional isocyanate is blended with the other ingredients of the formulation with stirring to ensure that the resultant mixture is homogeneous. The resultant liquid formulation is then poured into a suitable container having the dimensions of the desired product. Alternatively, the mixture is allowed to fall as a continuous stream onto a conveyor belt traveling between two upright walls. Once the foam has risen, the continuous slab is cut to the desired lengths. Foams prepared using the present gel catalysts are eminently suitable for molding into seat cushions, since they exhibit virtually no shrinkage, and therefore retain the dimensions of the mold in which they are formed.

Polyurethane foams usually require aging or "curing" to fully develop their physical properties. High resiliency foams will cure at room temperature in a relatively short time, usually between 1 and 7 days. Recently it has been found that the curing process can be completed in from 1 to 3 days if the foam is heated to a temperature between 70° and 140° C. during this period.

EXAMPLE

The improved load-bearing properties imparted by the present organotin catalysts were demonstrated using a formulation recommended for use in preparing high resiliency molded foams. The formulation is disclosed in the chemical literature (W. Patten et al., High Resiliency Foams Made With Polymer Polyols, J. Cellular Plastics, Vol. 9, No. 2, March-April, 1973).

The isocyanate, catalyst (as a 1% by weight solution in dioctyl phthalate) and a mixture containing the polyol and other components of the formulations were fed as three separate streams into the mixing chamber of a Martin Sweets "Modern Module 3" foam machine. The isocyanate component was a mixture containing 80% by weight of an isomeric mixture of o- and p-tolylene diisocyanates (20% ortho and 80% para isomers) and 20% polymethylene polyphenyl isocyanate. The polyol component contained the following ingredients:

|  |  | Parts (By Weight) |
|---|---|---|
| Polyol 1 - | Ethylene oxide-capped polypropylene oxide polymerized on glycerine (Mol/ Wt.=6,000, Hydroxyl No.=27) | 60 |
| Polyol 2 - | Ethylene oxide-capped polypropylene oxide polymerized on glycerine and containing grafted acrylonitrile-styrene copolymer (available as | |

-continued

|  | Parts (By Weight) |
|---|---|
| Niax ® polyol 34–28 from Union Carbide Chemical Corp.) | 40 |
| Water | 2.8 |
| Bis(N,N-dimethylamino ethyl ether) (blowing catalyst) | 0.08 |
| N-ethyl morpholine (blowing catalyst) | 0.80 |
| 33% solution of triethylene diamine in dipropylene glycol (blowing catalyst) | 0.35 |
| Silicone-based surfactant (available as Niax ® silicone L-5303 from Union Carbide Chemical Corporation) | 1.5 |

The amount of isocyanate employed was sufficient to provide 1.05 isocyanate groups for each active hydrogen present in the polyol and water.

The flow rates of the three components were adjusted to deliver 650 g. of the polyol mixture, 217 g. of the isocyanate component and either 1.88 g. or 0.63 g. of the specified catalyst (as a 1% by weight solution in dioctyl phthalate) during the eight second pour cycle. This composition was collected in a 16×16×8 inch (40×40×20 cm.) cardboard container and allowed to rise. After the foam had completely risen the surface was cured by placing the foam in a circulating air oven for 10 minutes. The temperature in the oven was 121° C.

When the samples were removed from the oven they were aged for one week under ambient conditions, at which time the indentation load deflection (ILD) values at 65% deflection were determined using the procedure described in ASTM test method D1564-71. The apparatus for the test consisted of a flat circular indentor foot with an area of 50 in.$^2$ (323 cm.$^2$) that was connected to an Instron ® tensile strength tester such that the test specimen could be compressed by the foot at a rate of 5.1 cm. per minute. The specimen was supported on a perforated plate having 0.6 cm.-diameter holes with the centers spaced 1.9 cm. apart. The plate measured 13.5 × 15 inches (34.3 × 38 cm.) and the specimens measured 12 × 12 × 1.7 inches (32 × 38 × 4.3 cm.). The test specimen was positioned under the indentor foot and the foot lowered to compress the specimen by 25%, i.e., to 75% of its original thickness. This degree of compression was maintained for 1 minute. The specimen was then further compressed at a rate of 5.1 cm./minute rate until the thickness was reduced by 65%, i.e., to 35% of the original value. The compressed specimen was then allowed to remain undisturbed on the support plate for 1 minute, after which it was released from compression. The loading required to maintain a reduction in thickness of 65% was measured at the end of the 1 minute period.

The various catalysts evaluated together with their concentration and the ILD$_{65\%}$ value for the foams prepared using each of the catalysts are summarized in the following table. Dibutyltin dilaurate, a conventional prior art gel catalyst for high resiliency foams, was employed as a control.

| Catalyst | Concentration (parts/100 parts polyol) | ILD$_{65\%}$ (lb./in.$^2$) |
|---|---|---|
| Dibutyltin Dilaurate (control) | 0.03 | 0.84 |
|  | 0.01 | 0.90 |
| Dioctyltin-S,S'-bis(isooctyl mercaptoacetate) | 0.03 | 1.26 |
|  | 0.01 | 1.36 |
| Dimethyltin-S,S'-bis(isooctyl mercaptoacetate) | 0.03 | 1.14 |
|  | 0.01 | 1.32 |
| Dibutyltin-S,S'-bis(isooctyl mercaptoacetate) | 0.03 | 1.08 |
|  | 0.01 | 1.18 |
| Dibutyltin bis | 0.03 | 0.86 |

| Catalyst | Concentration (parts/100 parts polyol) | ILD$_{65\%}$ (lb./in.$^2$) |
|---|---|---|
| (lauryl mercaptide) | 0.01 | 1.04 |

All foams prepared using of of the present catalysts exhibited higher ILD$_{65\%}$ values than the sample prepared using dibutyltin dilaurate. In practical terms, this means that the present catalysts impart a greater load-bearing ability to the foam than can be achieved using of of the most widely used prior art catalysts. The higher load-bearing properties permit a reduction in the minimum thickness required to support a given weight without completely compressing the foam.

What is claimed is:

1. A method for preparing a high resiliency polyurethane foam characterized by a value for the indentation load deflection, measured at 65% deflection, greater than one pound per square inch, said method comprising reacting at least one polyol selected from the group consisting of
   1. polyols exhibiting a molecular weight of between 4,500 and 6,000 and a hydroxyl number from 25 to 45,
   2. polyols exhibiting a molecular weight between 4,500 and 6,000 and a hydroxyl number from 25 to 45, wherein said polyol contains between 5 and 25%, based on the weight of said polyol, of side chains derived from the graft polymerization of acrylonitrile or a mixture of acrylonitrile and styrene,
   3. mixtures of polyols exhibiting a molecular weight from 4,000 to 8,000 and a diamine as a cross-linking agent, said diamine being present in an amount from about 0.5 to 6%, based on the weight of said polyol, with a polyfunctional isocyanate, a blowing agent comprising water and from 0 to 10%, based on the weight of said blowing agent, of a volatile fluorinated hydrocarbon that boils from $-40°$ to $+70°$ C., a silicone-base surfactant and as the polymerization catalyst, from 0.001 to 0.1%, based on the weight of said polyol, of an organotin compound of the formula $R_2^1Sn(SR^2COOR^3)$ wherein $R^1$ and $R^3$ are individually selected from the group consisting of alkyl radicals containing from 1 to 20 carbon atoms and $R^2$ is a methylene or ethylene radical.

2. A method according to claim 1 wherein the ratio of isocyanate radicals to active hydrogen atoms is from 0.95 to 1.1.

3. A method according to claim 1 wherein the blowing agent is water and the concentration of said blowing agent is from 2.0 to 4.0%, based on the weight of polyol.

4. A method according to claim 1 wherein the reaction between said water and polyfunctional isocyanate are reacted in the presence of a blowing catalyst selected from the group consisting of tertiary amines.

5. A method according to claim 1 wherein from 5 to 30%, by weight of the polyfunctional isocyanate is a polymeric polyfunctional isocyanate.

6. A method according to claim 1 wherein $R^1$ is alkyl and contains between 1 and 8 carbon atoms.

7. A method according to claim 6 wherein $R^1$ is methyl, butyl or octyl.

8. A method according to claim 1 wherein $R^2$ is methylene and $R^{30}$ is iso-$C_8$-$H_{17}$.

* * * * *